Aug. 14, 1956 A. S. CALVO 2,758,488
CHANGE SPEED PLANETARY GEARING WITH FLUID COUPLING MEANS
Filed Oct. 19, 1954
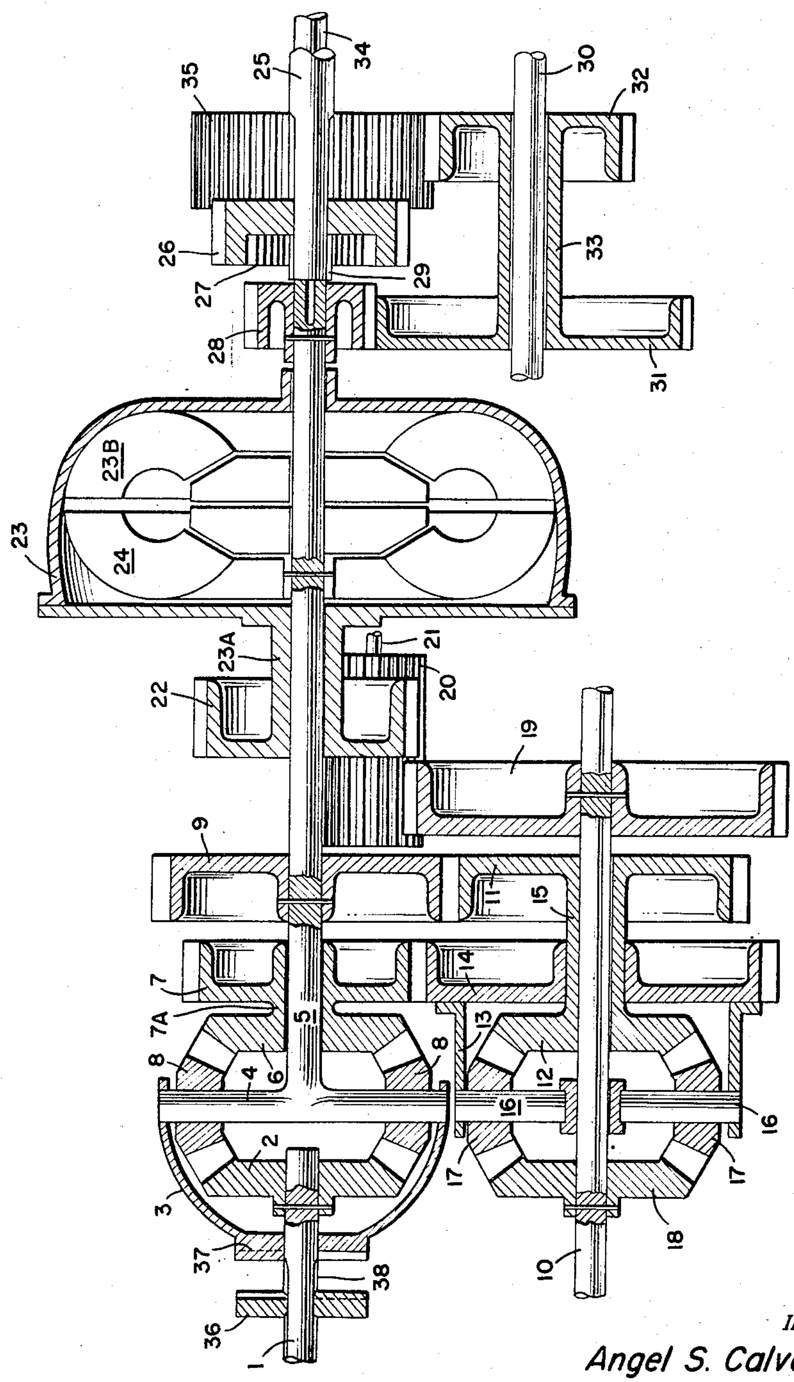
INVENTOR
Angel S. Calvo
BY A. Yates Dowell
ATTORNEY United States Patent Office 2,758,488

Patented Aug. 14, 1956

2,758,488

CHANGE SPEED PLANETARY GEARING WITH FLUID COUPLING MEANS

Angel S. Calvo, Mexico City, Mexico

Application October 19, 1954, Serial No. 463,256

7 Claims. (Cl. 74—677)

The present invention relates to power transmission apparatus and more specifically to a variable speed change transmission in which a transmission automatically accommodates for variations in load and speed.

An object of the present invention is to provide a transmission for transmitting power from a source of power to a load with automatic variation in the speed of movement of the load in accordance with the load resistance.

A further object is to provide a transmission for changing a torque of limited force to a torque load which varies from time to time and for automatically compensating for such variations without requiring manual control.

Another object of the invention is to provide a transmission in which power is conveyed from a source of power to the load through two paths which is united to overcome the load.

A further object of the invention is to provide a movable point of support for at least a part of the reaction of the load to prevent overload on the parts.

Other and further objects will be apparent upon reference to the drawing, wherein the single figure represents a longitudinal section through a transmission with the transmission housing and supporting bearings omitted for simplicity.

Briefly, the present invention relates to an automatically variable transmission in which a power shaft driven from a motor or other source of power delivers power to a driven shaft by means of planetary gearing and spur gearing systems, including a variable brake which may be a hydraulic, magnetic, electromagnetic or other suitable type for transmitting power to the driven shaft through different paths which come together at the brake and automatically compensate for different torques on the driven shaft. A suitable reversing gearing is provided between the driven shaft and the ultimate load for uses such as in automobiles which require reverse motion. A positive clutch is provided for direct connection between the power and the driven shaft when such condition is desired.

Referring to the drawing in detail, a power shaft 1 is connected to a suitable source of power such as an automobile engine and fixedly carries a beveled gear 2 thereon and rotatably supports a planet gear casing 3 into which casing a transverse shaft 4 is fixedly mounted so that such transverse shaft 4 will rotate with casing 3. Fixed onto transverse shaft 4 is a power driven shaft 5 in alignment with the power shaft 1. A combination bevel and spur gear including bevel portion 6 and spur portion 7 is rotatably mounted by means of a hub 7A on the drive shaft 5 with the bevel gear portion 6 in mesh with planetary gears 8, 8, rotatably mounted on the transverse shaft 4. A spur gear 9 is fixed on shaft 5.

A third shaft 10 is rotatably mounted in suitable bearings and supports a combination spur and bevel gear for relative rotation thereon with the spur gear portion 11 thereof in mesh with the spur gear 9 on the driven shaft 5 and the bevel gear portion 12 lying within a planetary gear case 13 of a combination planetary gear case and spur gear, the spur gear portion 14 and planetary gear case portion 13 being rotatably mounted on a connecting hub portion 15 of the spur and bevel gear combination 11 and 12. The spur gear portion 14 is in mesh with the spur gear portion 7 on the driven shaft. Stub shafts 16, 16 supported by planetary gear case 13 carry planetary gears 17, 17 in mesh with the bevel gear portion 12 of said combination bevel and spur gear on said third shaft 10. A bevel gear 18 fixed on the third shaft 10 is in mesh with the planetary gears 17, 17.

Also fixed on the third shaft 10 is a spur gear 19 which meshes with an idler gear 20 rotatably supported on a fourth shaft 21 and such idler gear meshes with a spur gear portion 22 of a combination spur and brake housing rotatably mounted on the driven shaft 5, the brake housing portion being designated 23 and connected to the spur gear portion 22 by a suitable hub 23A.

In the modification shown, the brake housing 23 is a housing for a fluid type brake in which a suitable hydraulic fluid is retained. An impeller 24 within the housing 23 is fixedly mounted on the driven shaft 5 for reaction with impellers 23B fixed on the casing 23.

A fifth shaft 25 splined on its forward end and in alignment with the driven shaft 5 slidably carries on the splined portion thereof a combination spur gear and clutch element, the clutch portion 27 thereof adapted to directly cooperate with a spur gear 28 fixed on the shaft 5 for positive driving engagement, the spline 29 of the shaft 25 serving to permit the driving and sliding engagement of the combination spur gear and clutch 26, 27.

A sixth shaft 30 arranged in spaced parallel relation to the other shafts rotatably support a pair of spur gears 31 and 32 connected together by a hub 33. The spur gear 31 being in mesh with spur gear 28 on shaft 5. A seventh shaft 34 rotatably supports an idler spur gear 35 which meshes with spur gear 32 and selectively meshes with spur gear portion 26 of the sliding spur gear and clutch element, the said spur gear and clutch element 26, 27 being operable by a suitable lever in a well known manner for selective engagement of the clutch portion 27 with the spur gear 28 for direct driving engagement or alternatively for engagement of the spur gear portion 26 with the idler spur gear 35 for reverse rotation of the shaft 25. The spur gear and clutch element 26, 27 also has an intermediate or neutral position for complete disconnection between the driven shaft 5 and the seventh shaft 25.

Slidably mounted on power shaft 1 is a positive clutch element 36 which engages a clutch element 37 fixed on the planetary gear case 3 so that when positive connection between driven shaft 5 and shaft 1 is desired the clutch element 36 may be moved by well known means into engagement with the clutch element 37, the clutch element 36 being slidably mounted in spline portion 38 of the shaft 1.

The brake, including brake housing 23 and impellers 23B and 24, may be of various other kinds such as a magnetic, electro-magnetic brake, or the like, whichever brake selected provides for accommodating the variation in speed of rotation between the driven shaft 5 and the brake housing 23. The brake structure provides for a reaction on a movable point of support and transferring the resulting work or torque on the movable point of support to the driven shaft for increasing the torque of the driven shaft and the torque to the load.

*Operation*

Assuming shaft 1 is rotating clockwise as viewed from the left end, it will be apparent that a positive direct drive may be obtained by engaging clutch element 36 with clutch element 37 thereby directly connecting shaft 1 and shaft 5 and if clutch 27 is in engagement with spur gear 28 the load shaft 25 will be also rotated clockwise. However, if the combination spur gear and clutch element 26, 27 is moved so that spur gear portion 26 is in engagement with idler gear 35, a reverse or counter-clockwise rotation is imparted to load shaft 25.

Assuming that clutch element 27 is in engagement with spur gear 28 and load shaft 25 is stationary, for example, when an automobile having the present transmission is at rest, and power shaft 1 is rotated in a clockwise direction, then bevel gear 2 will also rotate clockwise causing rotation of planetary gears 8, 8 about transverse shaft 4 imparting counterclockwise rotation to combination bevel and spur gear 6, 7 thereby producing a clockwise rotation of combination planetary gear case and spur gear 13, 14, causing planetary gears 17, 17 to rotate about shaft 10 in a clockwise direction. At this time spur and bevel gear combination 11, 12 will be stationary as shaft 5 and spur gear 9 will be stationary. Therefore the translatory clockwise rotation of planetary gears 17, 17 will cause an increased speed of clockwise motion in bevel gear 18 and shaft 10, thereby imparting clockwise rotation to spur gear 19 which causes counter-clockwise rotation of idler gear 20 and clockwise rotation of spur gear and brake housing 22, 23, resulting in the rotation of impeller blades 23B which, through the hydraulic fluid in the brake housing 23, urges the impeller blades 24 in a clockwise rotation thereby applying a clockwise torque on shaft 5.

Simultaneously the reaction from planetary gears, 8, 8 on bevel gears 2 and 6 will produce a torque urging the transverse shaft 4 to rotate in a clockwise direction about the shaft 5 and the net output of power on driven shaft 5 will be the combined forces through the two paths described above.

It will therefore be obvious that the automatic transmission will operate effectively in all situations from a stationary condition of a load shaft to conditions in which the load shafts rotate at any speed up to and including the speed of power shaft 1.

It will be obvious to those skilled in the art that various changes may be made in the invention without departing from the spirit and scope thereof and therefore the invention is not limited by that which is illustrated in the drawing and described in the specifications, but only as indicated in the accompanying claims.

What is claimed is:

1. An automatically variable transmission for the transfer of power from a source of power to a variable load comprising a power driven shaft having a bevel gear fixed thereon and a case rotatably mounted thereon, a driven shaft in alignment with said power shaft and having a transverse shaft mounted in said case and planetary gears on said transverse shaft meshing with said bevel gear on said power shaft, a combination bevel and spur gear rotatably mounted on said driven shaft with the bevel gear portion thereof meshing with said planetary gears, a spur gear fixed on said driven shaft, a third shaft arranged in substantially parallel relation to said shafts, a combination spur and bevel gear rotatably mounted on said third shaft with the spur gear portion thereof meshing with the fixed spur gear on said driven shaft, a combination spur gear and case rotatably mounted on said combination spur and bevel gear on said third shaft with the spur gear portion of said combination spur gear and case meshing with the spur gear portion of said bevel and spur gear on said driven shaft, planetary gears rotatably mounted on said case of said combination spur gear and case on said third shaft, a bevel gear fixed on said third shaft meshing with said last mentioned planetary gears, a spur gear fixed on said third shaft, an idler gear mounted for rotation on a fourth shaft meshing with said last mentioned spur gear, a combination spur gear and fluid brake housing rotatably mounted on said driven shaft with the spur portion thereof meshing with said idler gear, and an impeller in said brake housing fixed to said driven shaft for cooperation with said housing to react against said housing for accommodating variations in speeds of said driven shaft.

2. An automatically variable transmission for the transfer of power from a source of power to a variable load comprising a power driven shaft having a bevel gear fixed thereon and a case rotatably mounted thereon, a driven shaft in alignment with said power shaft and having a transverse shaft mounted in said case and planetary gears on said transverse shaft meshing with said bevel gear on said power shaft, a combination bevel and spur gear rotatably mounted on said driven shaft with the bevel gear portion thereof meshing with said planetary gears, a spur gear fixed on said driven shaft, a third shaft arranged in substantially parallel relation to said shafts, a combination spur and bevel gear rotatably mounted on said third shaft with the spur gear portion thereof meshing with the fixed spur gear on said driven shaft, a combination spur gear and case rotatably mounted on said combination spur and bevel gear on said third shaft with the spur gear portion of said combination spur gear and case meshing with the spur gear portion of said bevel and spur gear on said driven shaft, planetary gears rotatably mounted on said case of said combination spur gear and case on said third shaft, a bevel gear fixed on said third shaft meshing with said last mentioned planetary gears, a spur gear fixed on said third shaft, an idler gear mounted for rotation on a fourth shaft meshing with said last mentioned spur gear, a combination spur gear and fluid brake housing rotatably mounted on said driven shaft with the spur portion thereof meshing with said idler gear, an impeller in said brake housing fixed to said driven shaft for cooperation with said housing to react against said housing for accommodating variations in speeds of said driven shaft, a fifth shaft in line with said driven shaft, means for positively connecting said fifth shaft to said driven shaft for driving engagement, a sixth shaft disposed in parallel relation to said shafts and rotatably mounting a pair of connected together spur gears, a cooperating spur gear on the said driven shaft meshing with one of said pair of spur gears, a seventh shaft having an idler spur gear thereon with said idler spur gear meshing with the other of said pair of spur gears, a spur gear fixed against relative rotation on said fifth shaft for meshing engagement with said last mentioned idler gear for producing reverse rotation of said fifth shaft, said spur gear fixed against relative rotation on said fifth shaft providing for selective connection of said fifth shaft to said driven shaft for forward or reverse operation of said fifth shaft.

3. An automatically variable transmission for producing a difference in speed between a power shaft and a driven shaft comprising a gear on the power shaft, a gear case rotatably mounted on said power shaft and carrying planetary gears in mesh with said power shaft gear, a driven shaft, means on said driven shaft connected to said planetary gears, a combination gear rotatably mounted on said driven shaft with a one gear portion meshing with said planetary gears, a gear fixed on said driven shaft, a combination gear rotatably mounted on a third shaft with one gear portion thereof meshing with the gear fixed on said driven shaft and the other portion of said combination gear being connected to the first gear portion by a hub, a combination gear and planetary gear case rotatably mounted on said hub, planetary gears carried by said last mentioned planetary gear case and meshing with the other gear portion of said combination gear on said third shaft, the gear portion on said combination gear and planetary gear case on said third shaft meshing with the other gear of said combination gear on said driven shaft, a first fixed gear on said third shaft meshing with the planetary gears on said third shaft planetary gear case, a second fixed gear on said third shaft, an idler gear meshing with said second fixed gear on said third shaft, a combination gear and brake housing rotatably mounted on said driven shaft with the gear portion thereof meshing with said idler gear, said brake housing having impeller blades fixed thereon, impeller blades fixed to said driven shaft for cooperation with said impeller blades on said casing whereby a driving action is obtained between the housing impeller blades and the impeller blades fixed on said driven shaft, and means between said driven shaft and the load for positively connecting a load to the driven shaft for forward or reverse rotation.

4. An automatically variable transmission for producing a difference in speed between a power shaft and a driven shaft comprising a gear on the power shaft, a gear case rotatably mounted on said power shaft and carrying planetary gears in mesh with said power shaft gear, a driven shaft, means on said driven shaft connected to said planetary gears, a combination gear rotatably mounted on said driven shaft with one gear portion meshing with said planetary gears, a gear fixed on said driven shaft, a combination gear rotatably mounted on a third shaft with one gear portion thereof meshing with the gear fixed on said driven shaft and the other portion of said combination gear being connected to the first gear portion by a hub, a combination gear and planetary gear case rotatably mounted on said hub, planetary gears carried by said last mentioned planetary gear case and meshing with the other gear portion of said combination gear on said third shaft, the gear portion on said combination gear and planetary gear case on said third shaft meshing with the other gear of said combination gear on said driven shaft, a first fixed gear on said third shaft meshing with the planetary gears on said third shaft planetary gearcase, a second fixed gear on said third shaft, an idler gear meshing with said second fixed gear on said third shaft, a combination gear and brake housing rotatably mounted on said driven shaft with the gear portion thereof meshing with said idler gear, said brake housing having rotor blades fixed thereon, rotor blades fixed to said driven shaft for cooperation with said impeller blades on said casing whereby a driving action is obtained between the housing rotor blades and the rotor blades fixed on said driven shaft, and means between said driven shaft and the load for positively connecting a load to the driven shaft for forward or reverse rotation, a fifth shaft in line with said driven shaft and means for positively connecting said fifth shaft to said driven shaft for driving engagement, a pair of connected together spur gears rotatably mounted on a sixth shaft and a cooperating spur gear on the said driven shaft in engagement with one of said pair of connected together spur gears, an idler spur gear on a seventh shaft meshing with the other of said spur gears, a spur gear fixed against relative rotation on said fifth shaft meshing with said last mentioned idler gear for producing reverse rotation of said fifth shaft, said last mentioned gear including a clutch portion for positive connection to said cooperating gear on said driven shaft for rotation of said fifth shaft in the same direction as said power shaft, said spur gear fixed against relative rotation on said fifth shaft being also movable to an inoperative position and to a position meshing with said idler gear on said seventh shaft for reverse rotation of said fifth shaft.

5. An automatically variable transmission for the transfer of power from a source of power to a variable load comprising a power driven shaft having a gear fixed thereon and a case rotatably mounted thereon, a driven shaft in alignment with said power shaft and having a member mounted in said case and planetary gears on said member meshing with said gear on said power shaft, a combination gear rotatably mounted on said driven shaft with one gear portion thereof meshing with said planetary gears, a gear fixed on said driven shaft, a third shaft, a combination gear rotatably mounted on said third shaft with one gear portion thereof meshing with the fixed gear on said driven shaft, a combination gear and case rotatably mounted on said combination gear on said third shaft with the one gear portion of said combination gear and case meshing with the one gear portion of said combination gear on said driven shaft, planetary gears rotatably mounted on said case of said combination gear and case on said third shaft, a gear fixed on said third shaft meshing with said last mentioned planetary gears, a second gear fixed on said third shaft, an idler gear mounted for rotation on a fourth shaft meshing with said last mentioned second gear on said third shaft, a combination gear and yieldable brake rotatably mounted on said driven shaft with the gear portion thereof meshing with said idler gear, and one element of said brake fixed to said driven shaft for cooperation with the other brake element for yieldingly accommodating variations in speeds of said driven shaft.

6. The invention according to claim 5 in which a positive releasable clutch is provided between said power shaft and said driven shaft.

7. An automatically variable transmission for the transfer of power from a source of power to a variable load comprising a power driven shaft having a gear fixed thereon and a case rotatably mounted thereon, a driven shaft in alignment with said power shaft and having a member mounted in said case and planetary gears carried by said member meshing with said gear on said power shaft, a combination gear rotatably mounted on said driven shaft with one portion thereof meshing with said planetary gears, a gear fixed on said driven shaft, a combination gear and first yieldable brake element rotatably mounted on said driven shaft, a cooperating second brake element fixed on said driven shaft for cooperation with the first brake element for yieldably accommodating variations in speed of said driven shaft with respect to said power shaft, and power transferring means between said first mentioned combination gear and said gear fixed on said driven shaft and said second-mentioned combination gear and yieldable brake element for transferring a portion of the power from said power shaft to said driven shaft whereby two paths of power are provided from said power shaft to said driven shaft and said yieldable brake provides for variations in load and speed.

References Cited in the file of this patent

UNITED STATES PATENTS

| | | |
|---|---|---|
| 2,226,760 | Fottinger | Dec. 31, 1940 |
| 2,284,123 | Breer et al. | May 26, 1942 |
| 2,309,912 | Lazaga | Feb. 12, 1943 |
| 2,451,401 | Mitchell et al. | Oct. 12, 1948 |
| 2,480,032 | Kochis | Aug. 23, 1949 |